US 11,741,140 B2

(12) United States Patent
Mullins et al.

(10) Patent No.: US 11,741,140 B2
(45) Date of Patent: Aug. 29, 2023

(54) MARKETPLACE FOR CONVERSATIONAL BOT SKILLS

(71) Applicant: Microsoft Technology Licensing, LLC, Redmond, WA (US)

(72) Inventors: Christopher Lee Mullins, Sammamish, WA (US); Scott Jeff Gellock, Seattle, WA (US); Thomas Matthew Laird-McConnell, Kirkland, WA (US); Steven Wayne Ickman, Redmond, WA (US); Gabriel Gilabert, Brooklyn, NY (US); John Anthony Taylor, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 569 days.

(21) Appl. No.: 16/780,696

(22) Filed: Feb. 3, 2020

(65) Prior Publication Data

US 2021/0182341 A1    Jun. 17, 2021

Related U.S. Application Data

(60) Provisional application No. 62/949,327, filed on Dec. 17, 2019.

(51) Int. Cl.
*H04L 51/02* (2022.01)
*G06F 18/20* (2023.01)
(Continued)

(52) U.S. Cl.
CPC .... *G06F 16/3329* (2019.01); *G06F 16/90332* (2019.01); *G06F 16/951* (2019.01);
(Continued)

(58) Field of Classification Search
CPC ............ G06F 16/90332; G06F 16/951; G06F 16/9538; G06K 9/6227; H04L 51/02
See application file for complete search history.

(56) References Cited

U.S. PATENT DOCUMENTS

2008/0262982 A1    10/2008  Rajkhowa et al.
2018/0181558 A1*   6/2018   Emery ................... H04L 51/02
(Continued)

OTHER PUBLICATIONS

"Non Final Office Action Issued in U.S. Appl. No. 16/780,727", dated Jun. 21, 2021, 18 Pages.
(Continued)

*Primary Examiner* — Jennifer N Welch
*Assistant Examiner* — Reji Kartholy

(57) ABSTRACT

In non-limiting examples of the present disclosure, systems, methods and devices for enabling conversational bot communications are presented. A marketplace comprising an identity of a plurality of skills may be maintained, each of the plurality of skills associated with a manifest and a conversational bot. A request for execution of a specific skill may be received. A plurality of conversational bots may be identified, each of the plurality of conversational bots being associated with a manifest for executing the specific skill. The plurality of conversational bots may be ranked. The specific skill may be caused to be executed by the highest ranked conversational bot. In some examples, a plurality of highest ranked conversational bots may be surfaced and a bot that is selected may execute the specific skill.

18 Claims, 13 Drawing Sheets

(51) Int. Cl.
　　　*G06F 16/332*　　　(2019.01)
　　　*G06F 16/9032*　　(2019.01)
　　　*G06F 16/951*　　　(2019.01)
　　　*G06F 16/9538*　　(2019.01)

(52) U.S. Cl.
　　　CPC ........ *G06F 16/9538* (2019.01); *G06F 18/285* (2023.01); *H04L 51/02* (2013.01)

(56) References Cited

U.S. PATENT DOCUMENTS

| | | | |
|---|---|---|---|
| 2018/0287968 A1* | 10/2018 | Koukoumidis | ....... G06F 16/248 |
| 2018/0332167 A1* | 11/2018 | Lu | ....... G06F 16/3322 |
| 2019/0121909 A1* | 4/2019 | Dechu | ....... G06F 40/143 |
| 2019/0124020 A1* | 4/2019 | Bobbarjung | ....... G06Q 20/123 |
| 2020/0099633 A1 | 3/2020 | D'agostino et al. | |
| 2020/0374372 A1* | 11/2020 | Le Strat | ....... H04L 67/567 |
| 2021/0082400 A1 | 3/2021 | Vishnoi et al. | |
| 2021/0124800 A1 | 4/2021 | Williams | |
| 2021/0144107 A1* | 5/2021 | Liang | ....... G06N 5/04 |
| 2021/0182497 A1 | 6/2021 | Mullins et al. | |

OTHER PUBLICATIONS

"International Search Report & Written Opinion issued in PCT Application No. PCT/US20/060317", dated Jan. 29, 2021, 12 Pages.
"Final Office Action Issued in U.S. Appl. No. 16/780,727", dated Sep. 20, 2021, 20 Pages.

* cited by examiner

*FIG. 3*
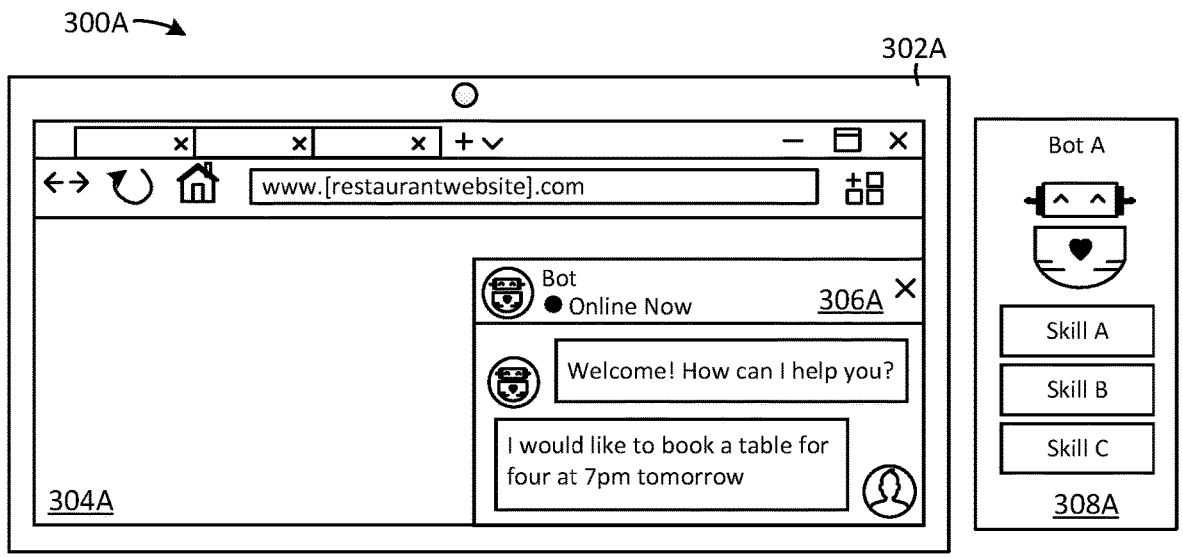
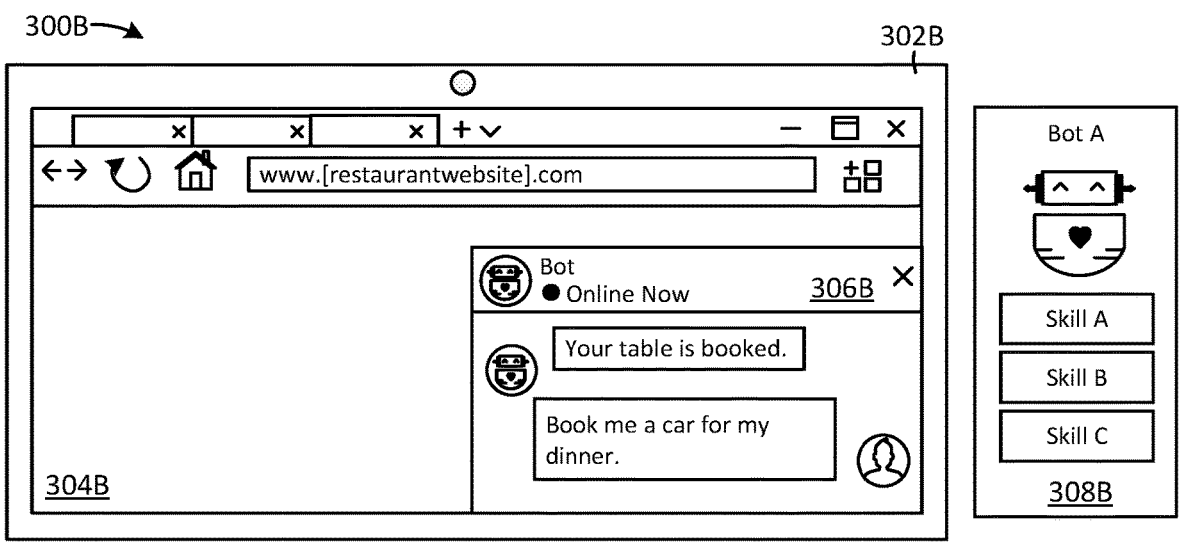

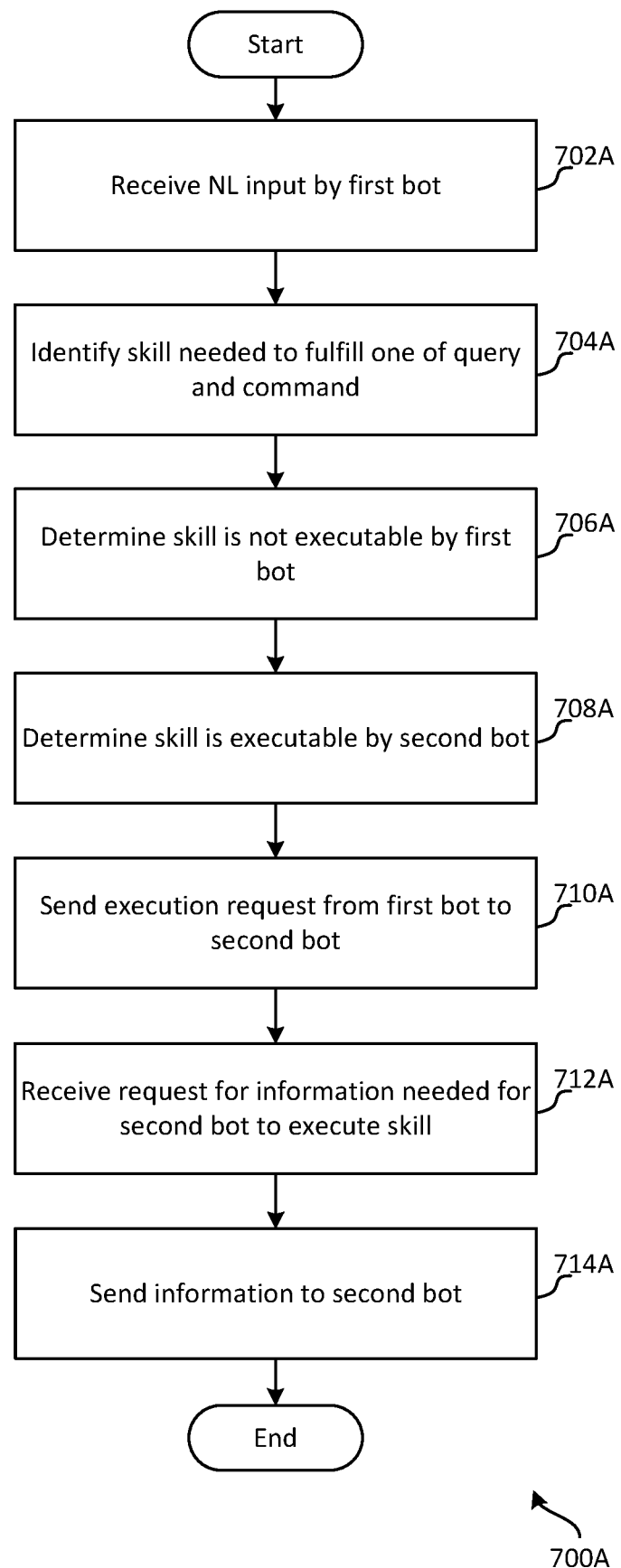

MARKETPLACE FOR CONVERSATIONAL BOT SKILLS

RELATED APPLICATIONS

This application is related to and claims priority to U.S. Provisional Patent Application No. 62/949,327 filed Dec. 17, 2019, and entitled "MARKETPLACE FOR CONVERSATIONAL BOT SKILLS," which is hereby incorporated by reference in its entirety.

BACKGROUND

Entities are increasingly using conversational bots to handle user request and commands related to their goods and services. Users often input complex queries and commands to conversational bots that cannot adequately process those requests for various reasons. For example, some requests are simply not supported by a corresponding conversational bot, and some requests may not be understood correctly. Additionally, while some requests may be understood correctly by a conversational bot, the conversational bot may nonetheless not have the requisite information needed to execute a skill needed to appropriately respond.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for enabling conversational bot communications. Examples described herein relate to one or more conversational bots, which may execute one or more skills. Each skill may be described in one or more manifests. A manifest may describe an object that is capable of sending and receiving conversational bot framework-compatible messages. A manifest may allow configuration, registration, and publishing data about a conversational bot and/or skill to be authored, stored, and transmitted between services. A manifest may describe how to contact a conversational bot, what capabilities a conversational bot offers, and information about how it should be published.

In examples, a user-bot conversation may be initiated via a messaging construct. The messaging construct may comprise a web chat interface, an application chat interface, or a digital assistant interface, for example. A user may provide a query or command to the conversational bot. The conversational bot may determine whether it has a skill that is required to fulfill the query or command. If the conversational bot has the skill, it may simply perform the skill and in some instance communicate the completion of the query or command to the user.

In examples where the conversational bot does not have the skill required to fulfill the query or command, it may determine whether there is another conversational bot that has the skill. The conversational bot that received the query or command (the primary conversational bot) may query a manifest marketplace or other skill repository to determine whether there is another conversational bot that may perform the skill and fulfill the query or command for the user. If a determination is made that there is another conversational bot that can execute the skill (the secondary conversational bot) the primary conversational bot may pass control of the conversation to the secondary conversational bot until the query or command is fulfilled. Passing the conversation may simply mean that the secondary conversational bot perform actions and/or communicate with the primary conversational bot, and need not necessarily communicate directly via the user chat interface. For example, the secondary conversational bot may send requests for information to the primary conversational bot, the primary conversational bot may obtain that information, and it may be passed back to the secondary conversational bot for skill execution. Once the secondary conversational bot has executed a requisite skill to complete an original request, the primary conversational bot may take control of the conversation back over and respond to the original query or command.

In some examples, an identity and a classification of a plurality of skills, manifests, and conversational bots may be stored in a manifest marketplace. The manifest marketplace may be searchable by skill type. In some examples, the skills, conversational bots, and/or manifests, may be scored based on website ranking factors. For example, websites that have associated conversational bots may have a rank score that may be provided to the manifest marketplace. The manifest marketplace may use the website ranking and in some cases one or more additional factors to rank conversational bots and associated skills. Skill requests from conversational bots may be routed to the manifest marketplace to determine whether there is a bot that can execute a particular skill needed to fulfill a request.

BRIEF DESCRIPTION OF THE DRAWINGS

Non-limiting and non-exhaustive examples are described with reference to the following figures:

FIG. 3 illustrates a computing device and an exemplary communication with a conversational bot associated with a restaurant entity.

FIG. 7A is an exemplary method for enabling conversational bot communications in relation to a natural language input.

DETAILED DESCRIPTION

Figure 1:
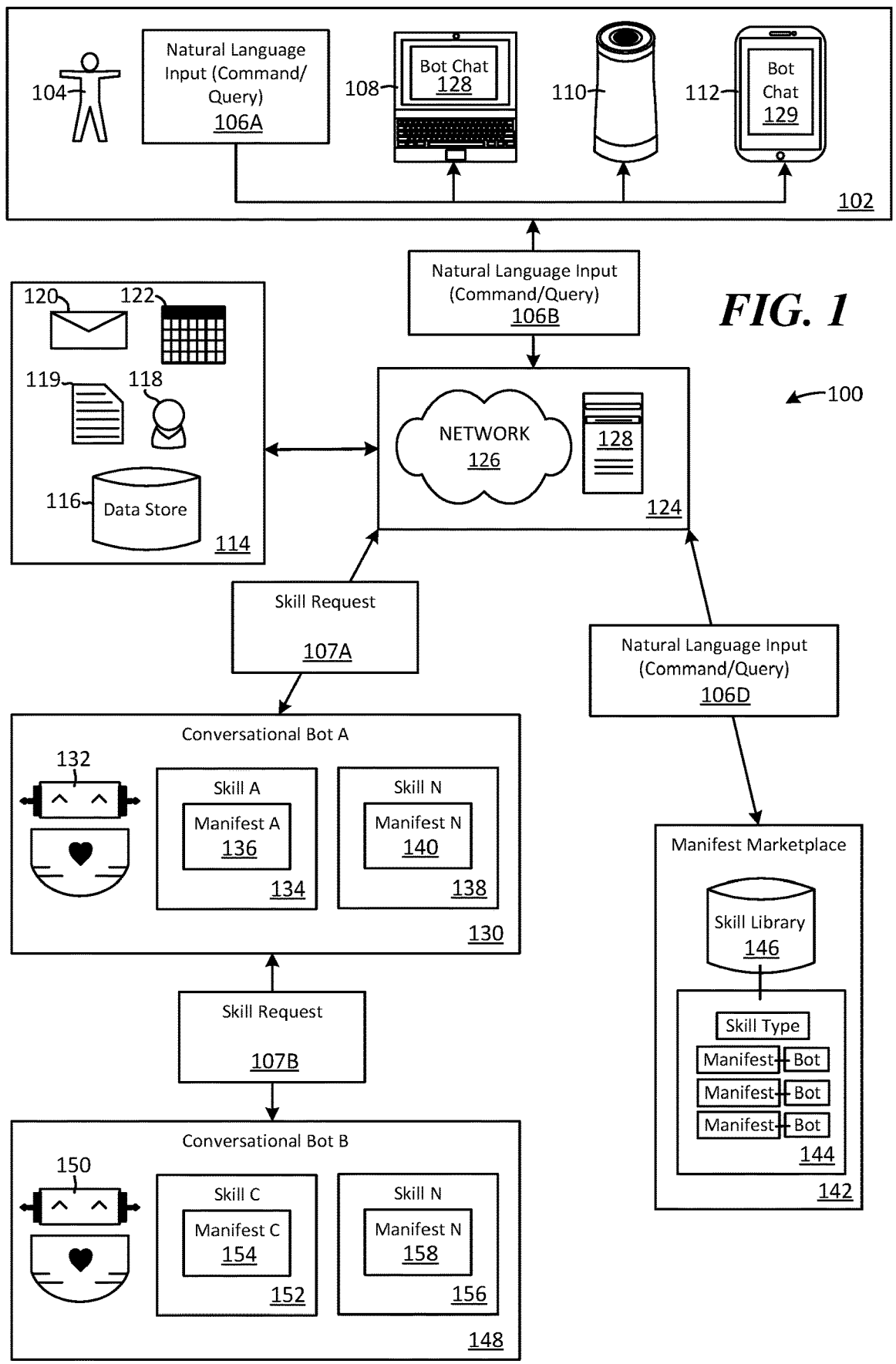
FIG. 1 is a schematic diagram illustrating an example distributed computing environment for enabling conversational bot communications.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for enabling conversational bot communications. A conversational bot may be published by, and/or associated with, a particular entity. For example, a first company may host a first conversational bot that provides artificial intelligence-driven conversational capabilities in relation to goods and/or services provided by that company, and a second company may host a second conversational bot that provides artificial intelligence-driven conversational capabilities in relation to goods and/or services provided by that company. Other entities that a conversational bot may be published by and/or associated with may include individual users, applications, websites, and/or digital assistants.

A conversational bot may comprise one or more software objects that interact with input (e.g., natural language input from a user, schematic input, object-oriented input) and/or other bots in a conversational manner A conversational bot may be associated with one or more skills, and each skill may be associated with one or more manifests. A skill may comprise one or more operations that are performed by a conversational bot to accomplish a task. A manifest may comprise one or more objects that describe how to contact a conversational bot, what capabilities a conversational bot offers, and information about how that information should be published.

In some examples, a conversational bot and/or one or more corresponding manifests may be hosted by an entity's website or database. In additional examples, a plurality of manifests, conversational bots, and/or skills may be stored in one or more repositories. Examples of a conversational bot repository include a conversational bot service and a manifest marketplace. Websites and repositories that host bot manifests may be searchable, and therefore utilized, by computing devices seeking to interact with corresponding bots. Computing devices and their associated applications and interfaces may interact with hosted bots and manifests utilizing one or more application programming interfaces (APIs).

In examples, when a conversational bot receives a request or command, a determination may be made by the conversational bot as to whether it has a skill (and corresponding manifest) that can fulfill that request or command. If a determination is made that the conversational bot does have a skill that can fulfill the request or command, and the conversational bot has all the information it needs to fulfill that request itself, it may execute the skill and fulfill the request or command. If a determination is made that the conversational bot does have a skill that can fulfill the request or command but that the conversational bot does not have all the information it needs to fulfill that request itself, it may cause a request for the missing information to be surfaced in a chat dialog with a user that can provide that missing information. In some examples, the conversational bot, if it has been granted permission to do so by a user (e.g., via account settings, via explicit input), may automatically obtain missing information needed to complete a request or command from a user account database or other information source associated with a requesting user.

In examples where a conversational bot does not have a skill needed to fulfill a request or command, the conversational bot, or a conversational bot service, may identify a secondary conversational bot that is capable of executing that skill and thereby fulfilling the request or command. In some examples, a conversational bot service may access a manifest marketplace to identify one or more conversational bots that have a skill that can fulfill a request or command. The manifest marketplace may include a skill library that includes an identity of each of a plurality of conversational bots, an identity of one or more skills that are associated with each of those conversational bots, and one or more manifests associated with those one or more skills. In some examples, the manifest marketplace may be populated with skills, conversational bots, and/or manifests via a registration process. In some examples, the manifest marketplace may require that skills are capable of performing, or necessarily perform, one or more actions. For example, the manifest marketplace may require that skills of a specific skill type execute an encryption or personal identifiable information (PII) scrubbing action on data they receive in order to be registered with the manifest marketplace. In additional examples, the manifest marketplace may only register skills/bots for publishers of those skills/bots that go through an authentication process and/or that meet certain authentication requirements. In some examples, websites that have associated conversational bots may include their manifest in the website directory. Thus, the manifest marketplace may crawl website directories to identify new skills that may be registered with the manifest marketplace.

In examples, rather than having only a single manifest marketplace, there may be a plurality of manifest marketplaces. For example, there may be one or more public marketplaces as well as one or more domain specific marketplaces. Additionally, private marketplaces may exist. For example, manifest marketplaces may exist behind corporate firewalls or inside a government data center. The non-public marketplaces may be searchable upon authentication of user domains and/or user credentials. According to some examples, a manifest marketplace may be maintained by an administrator. For example, an administrator for a marketplace may only allow certain bots and/or skills to be added to it. Additionally, an administrator for a marketplace may remove certain bots and/or skills as it sees fit and/or based on violations of a terms of service contract.

In examples, the skills and/or the manifests included in the skill library may be classified, tagged, organized, or otherwise associated with a skill type. As such, the skills and/or manifests may be searchable and/or matched to natural language queries and commands, and schema-defined queries and commands, that are received by the conversational bot service. According to some examples, a conversational bot may only hand off or accept skill execution operations to or from other conversational bots that have one or more skills and/or require one or more particular skills be performed. For example, a conversational bot may only hand off or accept skill execution operations to or from other conversational bots that will execute a PII scrubbing skill on any data associated with skill performance. In another example, a conversational bot may only hand off or accept skill execution operations to or from other conversational bots that will execute a data encryption skill on any data that it sends or receives.

In examples where a secondary conversational bot has been passed control of a conversation and/or execution of a skill, the secondary conversational bot may execute the skill that has been requested of it by the primary conversational bot (e.g., the bot in textual or audio communication with the user). In instances where the secondary conversational bot needs additional information to execute a skill, the secondary conversational bot may request that information from the primary bot or a different source. For example, the secondary conversational bot may provide a request for additional information that may be sent to the primary conversational bot and surfaced to the user in a conversational interface. The user may provide the necessary information that is required to the primary conversational bot, and that information may be provided by the primary conversational bot to the secondary conversational bot. In other examples, the secondary conversational bot may have been provided with access to obtain missing information directly (e.g., from a user database, from the user directly) rather than having to go through the primary conversational bot. In such instances, the secondary conversational bot may directly obtain the missing information and execute one or more skills so that a request or command received by the primary conversational bot can be completed. Once the request or command has been completed via execution of one or more skills by the secondary conversational bot, the secondary conversational bot may pass control over the conversation back to the primary conversational bot. The actions by the secondary conversational bot need never be seen by the interacting user. That is, in some examples, the requesting/commanding user need not receive a direct message form the secondary conversational bot. Rather, the primary conversational bot may relay any requests from the secondary conversational bot to the user or a database associated with the user, and/or the secondary conversational bot may perform actions on the backend that are never seen by the user aside from their results. In this way, the user may be provided with a seamless experience in which a single conversational bot accomplishes or facilitates all desired user actions.

In examples where a determination is made that a primary conversational bot does not have a skill needed to fulfill a request or command, and a further determination is made that there are no secondary conversational bots that have the skill needed to fulfill the request or command, the primary conversational bot may perform one or more fallback operations. A first fallback operation may comprise causing an indication (e.g., in a chat dialog) that the request or command cannot be fulfilled by the conversational bot to be surfaced. A second fallback operation may comprise causing a web search corresponding to the request or command to be performed and causing one or more results from that web search to be surfaced. A third fallback operation may comprise identifying one or more related tasks to the request or command that can be fulfilled via execution of an identified skill to be surfaced.

The systems, methods, and devices described herein provide technical advantages for performing tasks electronically and interacting with conversational bots. Processing costs (e.g., CPU cycles) associated with identifying services that may assist with task completion are reduced in that conversational bots may automatically identify other conversational bots associated with services that may be useful in executing skills that are needed for task completion. Privacy concerns associated with handing off information to third parties are also addressed via the mechanisms described herein in that when a task (e.g., a user query, a user command) is received by a first conversational bot, that conversational bot may require that secondary conversational bots that may complete portions of the task execute privacy-oriented skills (e.g., PII scrubbing skills, data encryption skills). User experience is also enhanced via the mechanisms described herein in that a user may have multiple conversational bots execute skills on her behalf, but only need to interact with a single conversational bot in the process. That is, because the systems, methods, and devices described herein allow for more interaction between conversational bots behind the scenes, the user need not be involved on the front end with each bot handling a request or command.

FIG. 1 is a schematic diagram illustrating an example distributed computing environment 100 for enabling conversational bot communications. Computing environment 100 includes natural language input sub-environment 102, network and processing sub-environment 124, data sources sub-environment 114, manifest marketplace sub-environment 142, first conversational bot sub-environment 130, and second conversational bot sub-environment 148.

Natural language input sub-environment 102 includes user 104, laptop computing device 108, digital assistant audio device 110, and mobile computing device 112. User 104 issues natural language input 106A. Natural language input 106A may comprise a command or a query. Natural language input 106A may be received by one of laptop computing device 108, digital assistant audio device 110, or mobile computing device 112. In examples, natural language input 106A may be received by a bot chat interface as illustrated by bot chat element 128 on laptop computing device 108, and bot chat element 129 on mobile computing device 112. For example, a website or application accessed on a computing device may surface a bot chat interface and a natural language input may be typed or audibly received by the bot chat interface. In other examples, natural language input 106A may be received by a digital assistant service, such as by a digital assistant service associated with digital assistant audio device 110. In examples where natural language input 106A is received by a digital assistant service, it may be sent from the digital assistant service to a conversational bot service. In examples where natural language input 106A is received directly by a bot interface, it may be automatically and/or directly received from a corresponding computing device (e.g., laptop computing device 108, mobile computing device 129) by a conversational bot service. Natural language input 106A may be sent to the conversational bot service via an API.

Network and processing sub-environment 124 includes network 126 and server computing device 128. Any and all of the computing devices described herein may communicate via a network, such as network 126 in network and processing sub-environment 124. Network and processing sub-environment 124 may comprise a conversational bot service. That is, a conversational bot service may be hosted by one or more server computing devices, such as server computing device 128. The conversational bot service may comprise a plurality of conversational bots. Each of the conversational bots may be associated with one or more manifests. A manifest may comprise an interface definition language (IDL) that includes instructions for sending, receiving, and processing commands associated with skills that a conversational bot may perform. A skill may comprise one or more activities that may be performed by a conversational bot. Additional details related to the elements that may be included in a manifest are described below in relation to FIG. 2. Certain bots associated with the conversational bot service may not be associated with their own manifests. That is, a conversational bot that receives inputs and directs those inputs to one or more other conversational bots, but which does not perform any skills itself, may be associated with one or more conversational APIs, but need not be associated with its own manifest or manifests.

In some examples, the conversational bot service may include or otherwise be associated with a manifest marketplace. The manifest marketplace is illustrated by manifest marketplace sub-environment 142. Manifest marketplace sub-environment 142 includes skill library 146. Skill library 146 includes an identity of each of a plurality of conversational bots, an identity of one or more skills that are associated with each of those conversational bots, and one or more manifests associated with those one or more skills. In examples, the skills and/or the manifests included in skill library 146 may be classified, tagged, organized, or otherwise associated with a skill type. As such, the skills and/or manifests may be searchable and/or matched to natural language queries and commands, and schema-defined queries and commands, that are received by the conversational bot service. For example, natural language input 106D may be provided to manifest marketplace 142 and one or more keywords or phrases included in natural language input 106D may be matched to one more skills or skill types in manifest marketplace 142.

The conversational bot service and/or the manifest marketplace may communicate with one or more data sources as illustrated by data sources sub-environment 114. Data sources sub-environment 114 includes data store 116, documents 119, user information 118, electronic messages 120, and calendar information 122. Data store 116 is representative of various data sources. Data store 116 may comprise data from the World Wide Web, data associated with conversational bot entities, and/or data associated with user accounts. Regarding data associated with user accounts, data store 116 may comprise data for a plurality of user accounts associated with one or more computing devices, one or more applications (e.g., productivity applications), and/or one or more application suites (e.g., productivity application suites). For example, user 104 may have a user account that is associated with one or more applications and/or services and data that includes settings for that user account, preferences for that user account, documents generated by that user account, documents sent by that user account, and/or documents received by that user account, all of which may be included in data store 116 with user information 118. Thus, in this example, data store 116 may include user information 118, documents 119 emails 120, and calendar information 122 (or references thereto) associated with one or more user accounts.

In this example, natural language input 106A is sent from one of laptop computing device 108, digital assistant audio device 110, or mobile computing device 112 to the conversational bot service in network and processing sub-environment 124 as illustrated by natural language input 106B. Natural language input 106B may be processed by one or more natural language processing models associated with the conversational bot service. In examples, the one or more natural language processing models may determine whether natural language input 106B includes a reference to a specific conversational bot, reference to a specific skill, a reference to a specific skill type, reference to a task to be performed, or any combination of the same. In examples where a specific skill and a specific conversational bot are identified in natural language input 106B, a schematized request to perform the skill may be sent from the conversational bot service to an endpoint corresponding to the specific conversational bot and the one or more manifests corresponding to the specific skill.

In examples where a specific conversational bot is not identified, but a specific skill and/or skill type is identified, further processing may be performed to determine a specific conversational bot and corresponding one or more manifests to send a request to. In some examples, the processing may comprise identifying one or more conversational bots, or entities associated with one or more conversational bots, that a user account for user 104 is associated with. For example, a user token comprising the identity of user 104 and/or user 104's user account may be provided to skill library 146 and a determination may be made as to one or more conversational bots and/or entities associated with conversational bots that user 104 has an account for. In additional examples, the processing may comprise identifying one or more conversational bots and/or entities that are publicly available for use (e.g., a user does not have to have an account to access). The processing may further comprise identifying one or more conversational bots that have one or more manifests for performing a skill corresponding to the identified specific skill and/or skill type. In examples where more than one conversational bot is identified as being capable of performing an identified specific skill from natural language input 106B, those conversational bots may be ranked. The ranking may comprise one or more metrics (e.g., popularity of website corresponding to conversational bot, popularity of conversational bot by other users, history of using conversational bot by user 104).

In some examples, once a conversational bot and one or more manifests associated with the conversational bot have been identified for performing the specific skill, the conversational bot service may send a request for performance of the skill to one or more endpoints for the identified manifests. In other examples, if a conversational bot is identified for performing the specific skill, but a specific manifest has not been identified, the conversational bot service may send the natural language directly to the conversational bot and the conversational bot may identify one or more manifests for performing the specific skill. In this example, conversational bot A 132 in first conversational bot sub-environment 130 is identified as being able to perform a specific skill identified in natural language input 106B. As such, the request for performance of the specific skill is sent to conversational bot A 132 via skill request 107A.

In examples, a conversational bot may initiate and open a conversation between an origination point and the conversational bot when a skill request is received. The origination point may comprise a computing device (e.g., laptop computing device 108, digital assistant audio device 110, mobile computing device 112), an interface where the skill request originated (e.g., bot chat interface 128, bot chat interface 129), and/or a conversational intermediary between an originating natural language input and the conversational bot (e.g., a digital assistant service, the conversational bot service). Thus, in this example, a conversation is initiated and opened by conversational bot A 132 when it receives skill request 107A. As an example, skill request 107A may comprise a request to perform skill A 134. Thus, skill request 107A may be send to an endpoint specified in manifest A 136. Skill A 134 may then be performed by conversational bot A 132.

In addition to request 107A including a request to perform skill A 134, request 107A may include a request to perform an additional skill that is not a skill that may be performed by conversational bot A 132. That is, the additional skill may not be skill A 134 or one of the other skills, such as skill N 138 and corresponding manifest N 140, that conversational bot A 132 is capable of performing. In examples, conversational bot A 132 may identify another conversational bot that is capable of performing the additional skill. For example, conversational bot A may query the conversational bot service and/or the manifest marketplace (e.g., skill library 146) to identify one or more bots and corresponding manifests for performing the additional skill.

In this example, conversational bot A identifies that the additional skill is skill C 152, which is performable by conversational bot 150 in second conversational bot sub-environment 148. As such, conversational bot A 132 send skill request 107B to the endpoint included in manifest C 154 corresponding to skill C 152. Conversational bot B 150 may then perform skill C 152 and return the result either directly to conversational bot A or to the origination point of the request (e.g., laptop computing device 108, bot chat interface 128, digital assistant audio computing device 110, mobile computing device 112, bot chat interface 129) where the result may be caused to be surfaced.

According to examples, if conversational bot B 150 requires additional information not specified in skill request 107B to fulfill the request, conversational bot B 150 may send a request for that additional information back to conversational bot A 132. For example, conversational bot B 150 may need location information for user 104, account credential information for user 104, and/or payment information for user 104, and that information may be requested from conversational bot A 132, which may obtain that information and return it to conversational bot B 150. In some examples, conversational bot A 132 may identify that information directly from user 104 via part of the conversation with user 104 on one of the devices included in natural language input sub-environment 102. In other examples, conversational bot A 132 may identify that information from an account associated with user 104 (e.g., from user information 118 in data sources sub-environment 114). The retrieval of that information may be made via execution of a specific skill and manifest associated with conversational bot A 132.

In examples where a first conversational bot sends a subsequent request to a second conversational bot, the first conversational bot may turn over control of the open conversation to the second conversational bot. Once the second conversational bot has completed the portion of the request corresponding to its skills, the second conversational bot may turn control of the conversation back over to the first conversational bot.

Figure 2:
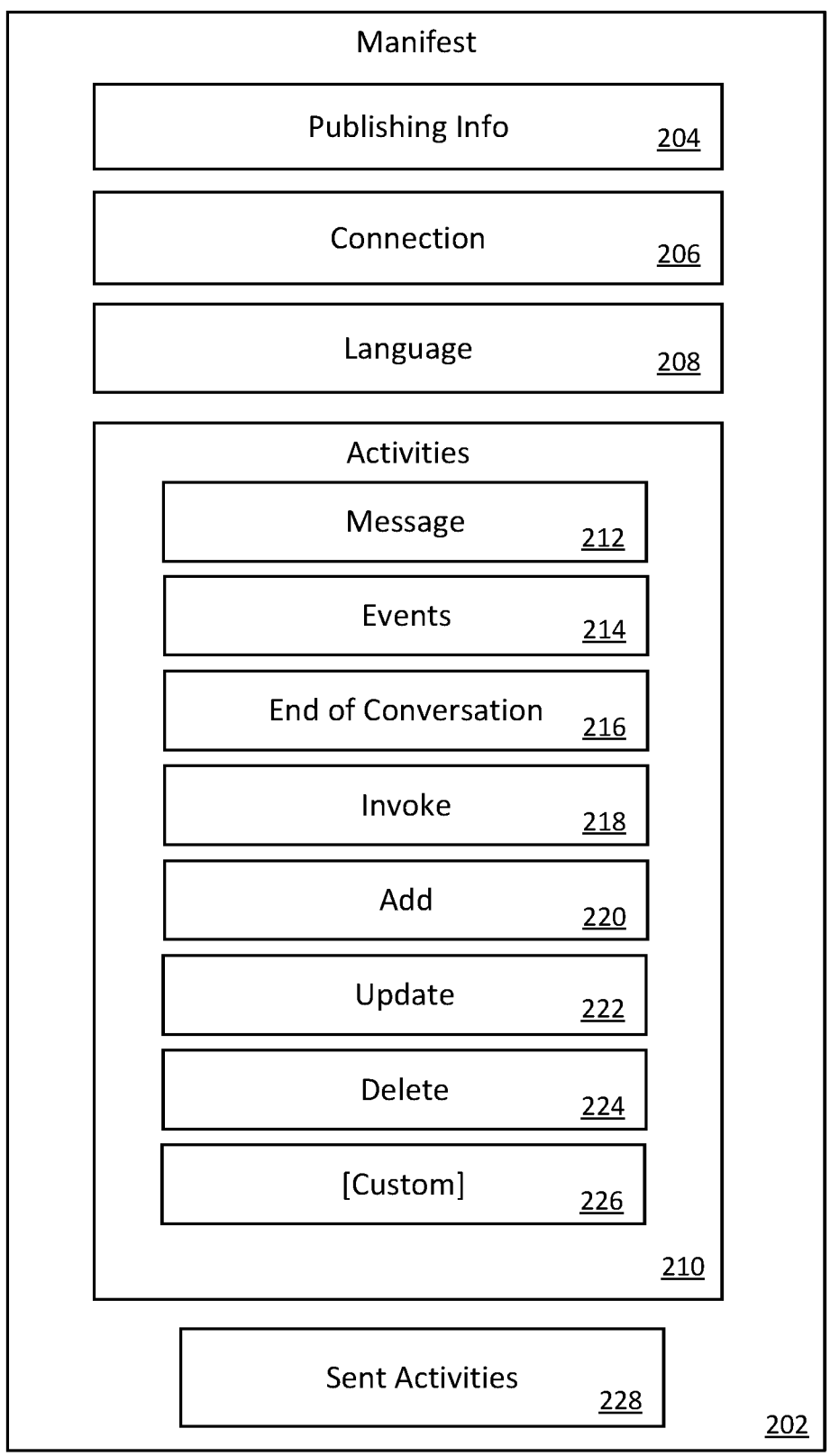
FIG. 2 illustrates a skill manifest and associated exemplary elements included in the skill manifest.

FIG. 2 illustrates a skill manifest 202 and associated exemplary elements included in the skill manifest. Manifest 202 comprises publishing information element 204, connection element 206, language element 208, activities element 210, and sent activities element 228. Activities element 210 further comprises message element 212, events element 214, end of conversation element 216, invoke element 218, add element 220, update element 222, delete element 224, and [custom] element 226. Manifest 202 may comprise more or fewer elements than illustrated in this example. Manifest 202 may describe an object that is capable of sending and receiving conversational bot framework-compatible messages. Manifest 202 may allow configuration, registration, and publishing data about a conversational bot to be authored, stored, and transmitted between services. Manifest 202 may describe how to contact a conversational bot, what capabilities a conversational bot offers, and information about how it should be published. Manifest 202 may be a flat list of name/value pairs, some of which are primitive, and some of which are complex (nested). Manifest 202 may be expressed in the JSON format but may also be projected into in-memory data structures in other languages (e.g., C#, JavaScript).

Publishing information element 204 may define an identity of a bot associated with manifest 202 that may execute activities included in manifest 202; a publisher of the one or more bots associated with manifest 202; copyright information for manifest 202; and license information for manifest 202. Publishing information element 204 may contain information about how a conversational bot is published into a registry (e.g., a conversational bot service, a manifest marketplace).

Connection element 206 may define endpoint information for connecting with manifest 202 from one or more geographic locations (e.g., North America endpoint, European endpoint). Connection element 206 may include an authentication connection representing a sign-in service containing parameters describing how to use a conversational bot to request user sign-in and consent.

Language element 208 may define an identity of one or more languages that are supported by the bot associated with manifest 202.

Activities element 210 may define operations that the bot can receive, execute, and/or modify. Activities element 210 may represent conversational behaviors made by humans and automated software within chat applications, email, and other text interaction programs. Each activity object my include a type field and represent a single action (e.g., send text content, send multimedia attachments, execute "like" button", typing indicator). Exemplary activities in activities element 210 are described below.

Message element 212 may define message types that may be received and attempted to be resolved by the bot. Message activities may represent content intended to be shown within a conversational interface. Message activities may contain text, speech, interactive cards, and binary or unknown attachments.

Events element 214 may define a plurality of named event type properties that indicate a task that a skill may execute. Events may be custom developed for each skill type. For example, for a flight booking skill there may be a "BookFlight" event that books a flight when called; for a calendar application there may be a "clock" event that checks an electronic calendar for calendar entries at periodic intervals when called; for an investment skill there may be a "GetStockPrice" event that obtains stock prices when called. Event activities may communicate programmatic information from a client or channel to a conversational bot. The meaning of an event activity may be defined by a "name" field, which may be meaningful within the scope of a channel. Event activities may be designed to carry both interactive information (such as button clicks) and non-interactive information (such as notification of a client automatically updating an embedded speech model). Event activities are the asynchronous counterpart to invoke activities. Event activities may be identified by a "type" value of event and specific values of the "name" field.

End of conversation element 216 may comprise a definition for ending an open conversation between a first conversational bot and the conversational bot associated with manifest 202 and/or ending an open conversation between the conversational bot associated with manifest 202 and a user communication element. In some examples, end of conversation activities may signal the end of a conversation from a recipient's perspective. This may be because the conversation has been affirmatively ended, or because the recipient has been removed from the conversation in a way that is indistinguishable from it ending. End of conversation activities may be identified by a "type" value.

Invoke element 218 may define a plurality of named invoke type properties that indicate a task that a skill will execute. Invoke activities may communicate programmatic information from a client or channel to a conversational bot, and have a corresponding return payload for use within a channel. Invoke activities are the synchronous counterpart to event activities. Event activities may be designed to be extensible. Invoke activities may differ only in their ability to return response payloads back to a channel; because the channel must decide where and how to process these response payloads, invoke may only be useful in cases where explicit support for each invoke name has been added to a channel. Invoke activities may be identified by a "type" value of "invoke" and specific values of the "name" field.

Add element 220 may comprise a definition for adding operations and/or content to an existing activity.

Update element 222 may comprise a definition for updating operations and/or content for an existing activity.

Delete element 224 may comprise a definition for deleting operations and/or content from an existing activity.

[Custom] element 226 may comprise custom definitions for activities that may be created by bot developers for use in custom skills.

Sent activities element 228 may comprise activities that a conversational bot can send to a skill (e.g., to a different conversational bot). In contrast, activities 210 may comprise activities that a conversational bot corresponding to manifest 202 may perform.

FIG. 3 illustrates a computing device 302A/302B and an exemplary communication with a conversational bot associated with a restaurant entity. Computing device 302A in sub-environment 300A, and computing device 302B in sub-environment 300B are the same computing device.

Web browser 304A is open on computing device 302A. Web browser 304A is currently navigated to www.[restaurantwebsite].com. In this example, a user is interacting with the restaurant entity via a conversational bot for that entity. Specifically, real-time bot chat window 306A is being utilized to communicate with conversational bot A 308A. Conversational bot A 308 may be hosted by a conversational bot service and may be associated with a plurality of manifests (e.g., a manifest for skill A, a manifest for skill B, a manifest for skill C).

Conversational bot A 308A opened the dialog in chat window 306A with the text "Welcome! How can I help you?" The user then responded with the natural language input "I would like to book a table for four at 7 pm tomorrow".

Moving to sub-environment 300B, in response to the user's natural language input discussed above, conversational bot A 308B communicates the text "Your table is booked" in chat window 306B. That is, conversational bot A 308A may have executed a "BookTable" skill (e.g., one of skills A, B, or C). The user then responded with the natural language input "Book me a car for my dinner." Additional details regarding the processing of this natural language input are discussed below in relation to FIG. 4.

Figure 4:
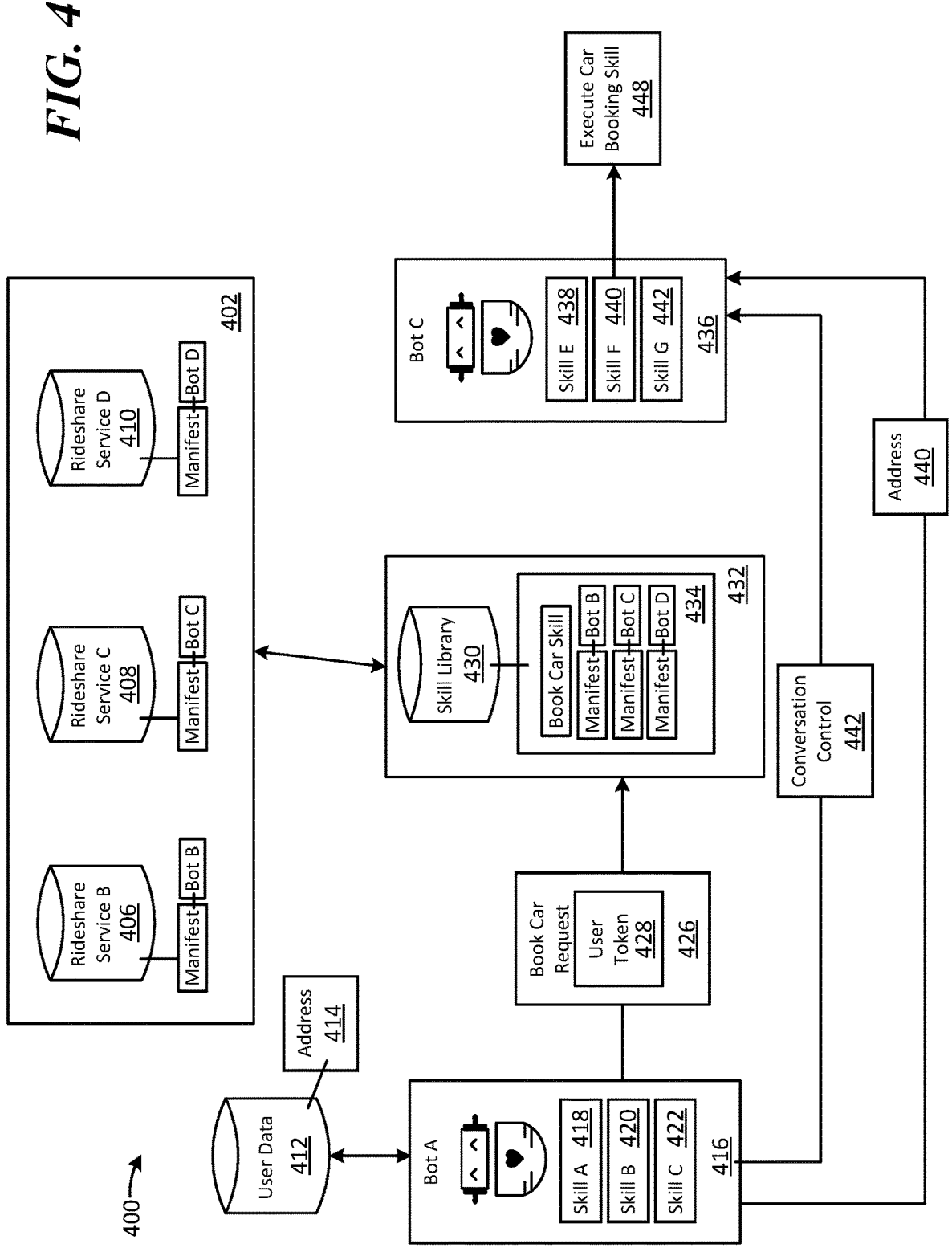
FIG. 4 illustrates bot-to-bot communications and the processing of a command from the bot communication of FIG. 3.

FIG. 4 illustrates bot-to-bot communications and the processing of a command from the bot communication of FIG. 3. The command at issue in this example is book car request 426, which originated from the natural language input "Book me a car for my dinner." That natural language input was received by conversational bot A 416, which is associated with the restaurant entity. Conversational bot A 416 has three skills that it can perform. Specifically, conversational bot A 416 can perform skill A 418, skill B 420, and skill C 422. However, when conversational bot A 416, or the conversational bot service on behalf of conversational bot A 416, receives the natural language input and processes it with one or more natural language processing models, a determination may be made that none of the skills that conversational bot A can perform will fulfill an identified "book car" command.

Because conversational bot A 416 determines that it cannot fulfill the "book car" command itself, it may determine whether one or more other bots that the user that generated the corresponding natural language input has access to may fulfill the "book car" command. In this example, conversational bot A 416 sends book car request 426 and user token 428 to manifest marketplace sub-environment 432. Book car request 426 may comprise the natural language input originally received by conversational bot A 416 or a schematized version of that natural language input. User token 428 may comprise an account identity associated with the user that provided the natural language input and/or security credentials associated with that account. This information may be obtained by conversational bot A 416 from user data store 412.

Manifest marketplace sub-environment 432 includes skill library 430. Skill library 430 includes an identity of each of a plurality of conversational bots, an identity of one or more skills that are associated with each of those conversational bots, and one or more manifests associated with those one or more skills. In examples, the skills and/or manifests included in skill library 430 may be classified, tagged, organized, or otherwise associated with a skill type. As such, the skills and/or manifests may be searchable and/or matched to natural language queries and commands, and schema-defined queries and commands, that are received by the conversational bot service and/or the manifest marketplace.

In this example, a determination is made of a skill type associated with book car request 426 of "book car" skill. Thus, a plurality of book car skill bots (bot B, bot C, bot D) and corresponding manifests that are capable of performing the desired skill and handling book car request 426 are illustrated in book car skill element 434. Each of those book car skill bots and corresponding manifests are associated with a different rideshare service. This is illustrated by rideshare service sub-environment 402. For example, conversational bot B corresponds to rideshare service B database 406, conversational bot C corresponds to rideshare service C database 408, and conversational bot D corresponds to rideshare service database D 410. Although the databases for the rideshare services are illustrated as containing their corresponding bots and manifests, the bots and manifests may be maintained separately by the conversational bot service.

According to examples, a determination may be made, utilizing user token 428, via the manifest marketplace and/or communication with one or more of rideshare service B database 406, rideshare service C database 408, and/or rideshare service D 410, that the user account associated with the natural language input book car request only has an account for one or a subset of the rideshare services and/or that settings associated with that user account indicate a preference for one of the rideshare services. In this example, a determination has been made that the rideshare service that the user account has an account with and/or a preference for using corresponds to rideshare service C database 408. As such, conversation control 442 is passed from conversational bot A 416 to conversational bot C 436, which is the conversational bot for that rideshare service. Conversation control 442 may comprise backend communications and operations that are never surfaced in a communication with a corresponding user. For example, conversational control 442 here may comprise conversational bot C 436 communicating with conversational bot A 416, one or more additional conversational bots, and/or user data store 412.

Conversational bot C 436 may perform three skills (skill E 438, skill F 440, and skill G 442). At least one of those skills corresponds to a "book car" skill that is needed to complete book car request 426. However, in some instances it may be the case that a bot that has taken control of a conversation needs additional information to complete to execute a skill and complete a request. In this example, conversational bot C 436 makes a determination that it needs one or both of an address where the user needs to be picked up and/or an address where the user needs to be dropped off. Depending on user privacy settings, conversational bot C 436 may obtain that address information directly from user data store 412 if it is available, or from conversational bot A 416. In examples where that information is not available from user data store 412, conversational bot C 436 may request the address information from conversational bot A 416. As such, conversational bot A 416 may surface a request for that information in the bot chat window that it has open on one of the computing devices associated with the user, the user may provide that information to conversational bot A 416, and address information 440 may then be provided from conversational bot A 416 to conversational bot C 436.

Once conversational bot C 436 has all the requisite information needed to execute the "book car" skill it may execute and fulfill book car request 426, as indicated by execute car booking skill element 448. Upon executing the "book car" skill, conversational bot C 436 may send an "end of conversation" action indication to conversational bot A 416, which may then take back control of the conversation.

Figure 5:
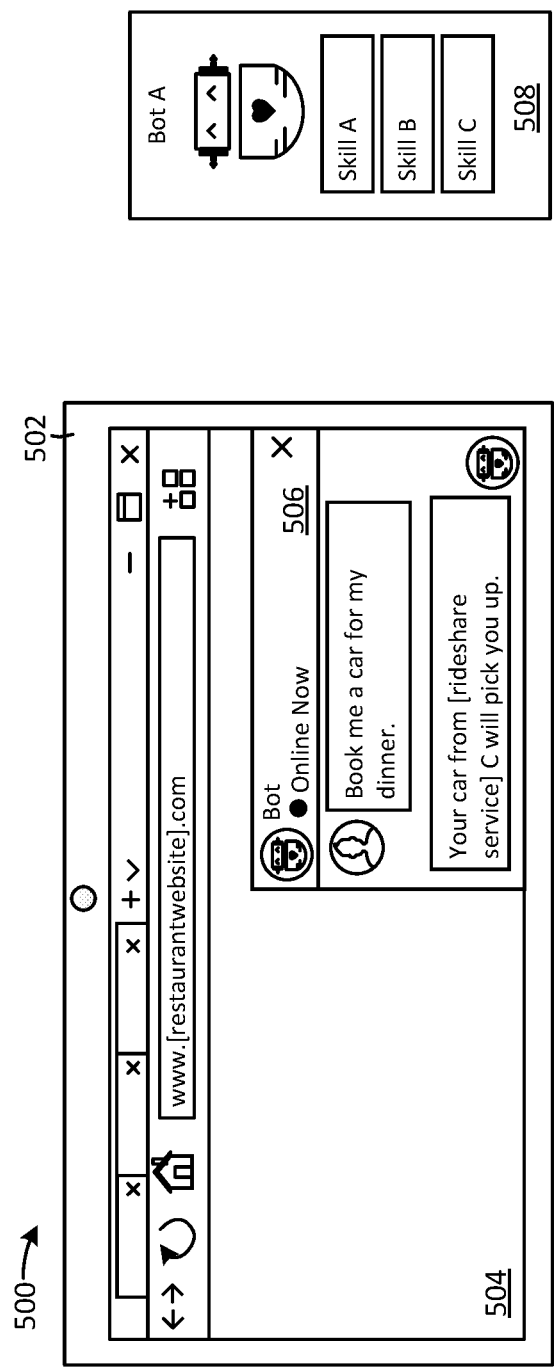
FIG. 5 illustrates a computing device that displays the result of the processing and bot-to-bot communications performed in relation to FIG. 4.

FIG. 5 illustrates a computing device 502 that displays the result of the processing and bot-to-bot communications performed in relation to FIG. 4. Conversational bot A 508 has taken control of the conversation back from the rideshare conversational bot (conversational bot C 436). Computing device 502 displays web browser 504 and bot messaging window 506. The user has previously provided the natural language input "Book me a car for my dinner" in messaging window 506, conversational bot A 508 processed that request in combination with conversational bot C 436, and the conversational bot notes this in messaging window 506 with the text "Your car from [rideshare service] C will pick you up.

Although FIGS. 3-5 illustrate bot-to-bot communications and user communications in relation to a bot messaging window in a website, other messaging constructs are within the scope of this disclosure. For example, conversational bot A 508 may communicate with the user via an audio device, via an intermediary digital assistant, via SMS message, and/or via email.

Figure 6:
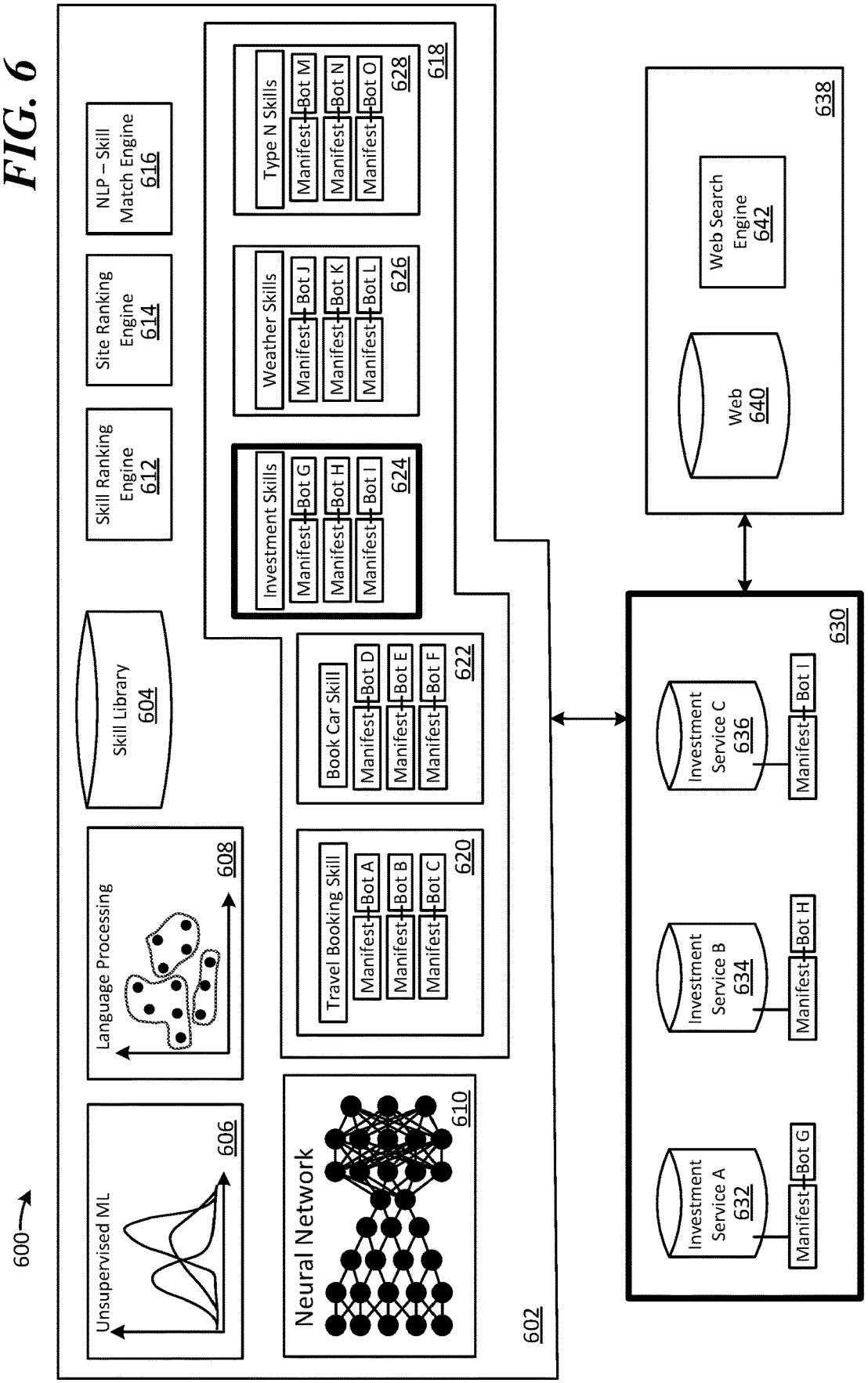
FIG. 6 is a schematic diagram illustrating an example distributed computing environment for identifying relevant skills from a manifest marketplace in relation to natural language input queries and commands.

FIG. 6 is a schematic diagram illustrating an example distributed computing environment 600 for identifying relevant skills from a manifest marketplace in relation to natural language input queries and commands Computing environment 600 includes manifest marketplace 602, company database sub-environment 630, and web service sub-environment 638.

Manifest marketplace 602 includes skill library 604. Skill library 604 includes an identity for each of a plurality of conversational bots, an identity of one or more skills that are associated with each of those conversational bots, and one or more manifests associated with those one or more skills. In examples, the skills and/or manifests included in skill library 604 may be classified, tagged, organized, or otherwise associated with a skill type. As such, the skills and/or manifests may be searchable and/or matched to natural language queries and commands, and schema-defined queries and commands, that are received by the conversational bot service.

In this example, manifest marketplace 602 includes skill classifications 618. That is, there are a plurality of skill types for which corresponding manifests and conversational bots have been classified by skill type. Skill classifications 618 includes travel booking skills 620, with corresponding conversational bots A, B and C; book car skills 622, with corresponding conversational bots D, E and F; investment skills 624, with corresponding conversational bots G, H and I; weather skills 626, with corresponding conversational bots J, K and L; and type N skills 618 (exemplary of any miscellaneous skill type), with corresponding conversational bots M, N and O. The skill type divisions that are illustrated may be further divided in sub-classes and sub-classes of sub-classes. For example, travel booking skills 620 may be divided into flight booking skills, hotel booking skills, train booking skills. Book car skills 622 may be divided into car types and ride share types. Investment skills 624 may be divided by transaction type, pay or no pay, and cost per transaction. Weather skills 626 may be divided by geographic region and radar types.

Company database sub-environment 630 illustrates three exemplary investment services that each have a corresponding conversational bot. Although the three exemplary investment services are illustrated as being in the same sub-environment, they each correspond to a different service and therefore are separate and distinct from one another. For example, investment service A database 632 is associated with conversational bot G, which may perform one or more investment skills. Investment service B database 634 is associated with conversational bot H, which may perform one or more investment skills. Investment service C database 636 is associated with conversational bot I, which may perform one or more investment skills. The skills performed by each of those bots may be the same skill or a different skill. The manifests for those skills may differ by publishing elements only, or by a plurality of elements (e.g., endpoints, languages, activities, sent activities).

Manifest marketplace 602 further includes skill ranking engine 612, site ranking engine 614, and natural language processing skill matching engine 616. Skill ranking engine 612 and/or site ranking engine 614 may receive data from web service sub-environment 638. The data may comprise website rank data or data that may be utilized by skill ranking engine 612 and/or site ranking engine 614 to rank websites and associated skills. For example, web service sub-environment 638 includes web data 640 for websites and web search engine 642 from one or more search engines. Web data 640 may include an identity of a plurality of websites associated with entities that have conversational bots. Web data 640 may further include use data associated with those websites. For example, web data 640 may include a number of users that access a website, a frequency of access for a website, engagement data with a website (e.g., amount of time spent by users, number of pages of website viewed, number of scrolls on each page, number of orders placed), and/or engagement data with a conversational bot associated with a web page. Web search engine 642 may provide additional information to web data 640 that may be received by skill ranking engine 612 and/or site ranking engine 614. For example, search engine 642 may collect information related to number of searches for a particular website and/or conversational bot, a number of clicks on websites and/or conversational bot elements, a frequency of searches, and search term patterns. Any of that data may be provided to skill ranking engine 612 and/or site ranking engine 614.

Skill ranking engine 614 may utilize data from web service sub-environment 638, site ranking engine 614, and/or skill use data from skill library 604 in calculating scores for skills and ranking them. The scores may be based on one or more of popularity of skill, popularity of conversational bot associated with skill, and/or popularity of entity associated with conversational bot. One or more machine learning models, such as neural network 610 and unsupervised machine learning model 606 may be utilized in calculating scores for websites and skills.

Natural language processing skill match engine 616 may perform operations associated with identifying relevant words and phrases from a natural language input provided to a conversational bot and matching those words and/or phrases to one or more highest ranked skills. Natural language processing skill match engine 616 may apply one or more language processing models, such as language processing model 608 in scoring words as being relevant to a skill. Language processing model 608 may comprise one or more word and/or sentence embedding layers (e.g., Word2Vec, BERT, Sent2Vec, Embeddings from Language Models (ELMo), recurrent neural network).

Language processing model 608 may further comprise a sentence level information aggregation layer for aggregating embeddings from each word in a natural language input into a distinct embedding for one or more sentences included in a natural language input. The distinct sentence aggregation layer may apply a neural network to the embeddings for each word. In examples, the neural network may comprise a gated recurrent unit (GRU) neural network or bidirectional GRU (bi-GRU) neural network. In other examples the neural network may comprise a long short-term memory (LSTM) neural network, an attention-based aggregation method, etc.

Language processing model 608 may further comprise a contextual aggregation layer for aggregating each distinct embedding for each of the sentences into a contextual embedding. In aggregating the distinct embeddings for each sentence, the contextual aggregation layer may apply a neural network to each distinct embedding for each of the sentences. In examples, the neural network may comprise a GRU neural network, or bi-GRU neural network. In other examples, the neural network may comprise an LSTM neural network, an attention-based aggregation method, etc.

Language processing model 608 may further comprise a scoring layer for scoring and ranking each of the sentences in a natural language input based on their relevance to a skill type (e.g., a "book car" skill type, "get stock price" skill type). In scoring and ranking each sentence, the scoring layer may apply a classifier function to each contextual embedding for each of the plurality of sentences (e.g., the embeddings generated by the contextual aggregation layer). In examples, the classifier function may comprise a sigmoid function. Other activation functions (e.g. tanh, softplus) may be utilized for scoring each sentence.

FIG. 7A is an exemplary method 700A for enabling conversational bot communications in relation to a natural language input. The method 700A begins at a start operation and flow moves to operation 702A.

At operation 702A a natural language input is received by a first conversational bot. The natural language input may be received via a chat interface in a website, a chat interface in an application, a real-time messaging application, an SMS message, an email, and/or an intermediary digital assistant. The natural language input may be associated with a user account. For example, a user may be signed into an account associated with a web browser application, one or more applications, and/or an application service, and the account information may therefore be made available to the conversational bot.

From operation 702A flow continues to operation 704A where a skill needed to fulfill one of: a query included in the natural language input, and a command included in the natural language input, is identified. The skill may be associated with one or more manifests. A manifest may comprise one or more objects that describe how to contact a conversational bot, what capabilities a conversational bot offers, and information about how that information should be published. The skill may comprise one or more operations that may be performed by a conversational bot to accomplish a task. The skill may be identified via application of one or more natural language processing models to the natural language input.

From operation 704A flow continues to operation 706A where a determination is made that the skill is not executable by the first conversational bot. for example, the conversational bot and/or a conversational bot service may determine that the first conversational bot does not have a manifest that includes one or more activities needed to perform the skill.

From operation 706A flow continues to operation 708A where a determination is made that the skill is executable by a second conversational bot. The determination may be made by the conversational bot, a conversational bot service, and/or a manifest marketplace. In some examples, there may be more than one conversational bot that is identified as capable of executing the skill. In such examples, the plurality of bots may be scored and ranked based on factors including: popularity of conversational bot, popularity of website associated with conversational bot, and user preferences.

From operation 708A flow continues to operation 710A where a request for execution of the skill is sent from the first conversational bot to the second conversational bot. The request may be sent via an API. In some examples, the request may comprise the natural language input. In other examples, the request may comprise a schematized request for execution of the skill. In additional examples, the request may include a token describing the user (or user account) that generated the natural language input.

From operation 710A flow continues to operation 712A where a request for information needed for the second conversational bot to execute the skill is received by the first conversational bot from the second conversational bot. The information may relate to the user that generated the natural language input. For example, the second conversational bot may need payment information, time information, location information, among other information types, to execute the skill. In some examples, when the first conversational bot receives the request for information, it may request that information from the user (e.g., via a chat window, via an audio query). In other examples, when the first conversational bot receives the request for information, it may determine whether that information is available in a user store associated with a user account for the user.

From operation 712A flow continues to operation 714A where the information is sent by the first conversational bot to the second conversational bot. The second conversational bot may execute the skill and turn control of the conversation back over to the first conversational bot.

From operation 714A flow moves to an end operation and the method 700A ends.

Figure 7B:
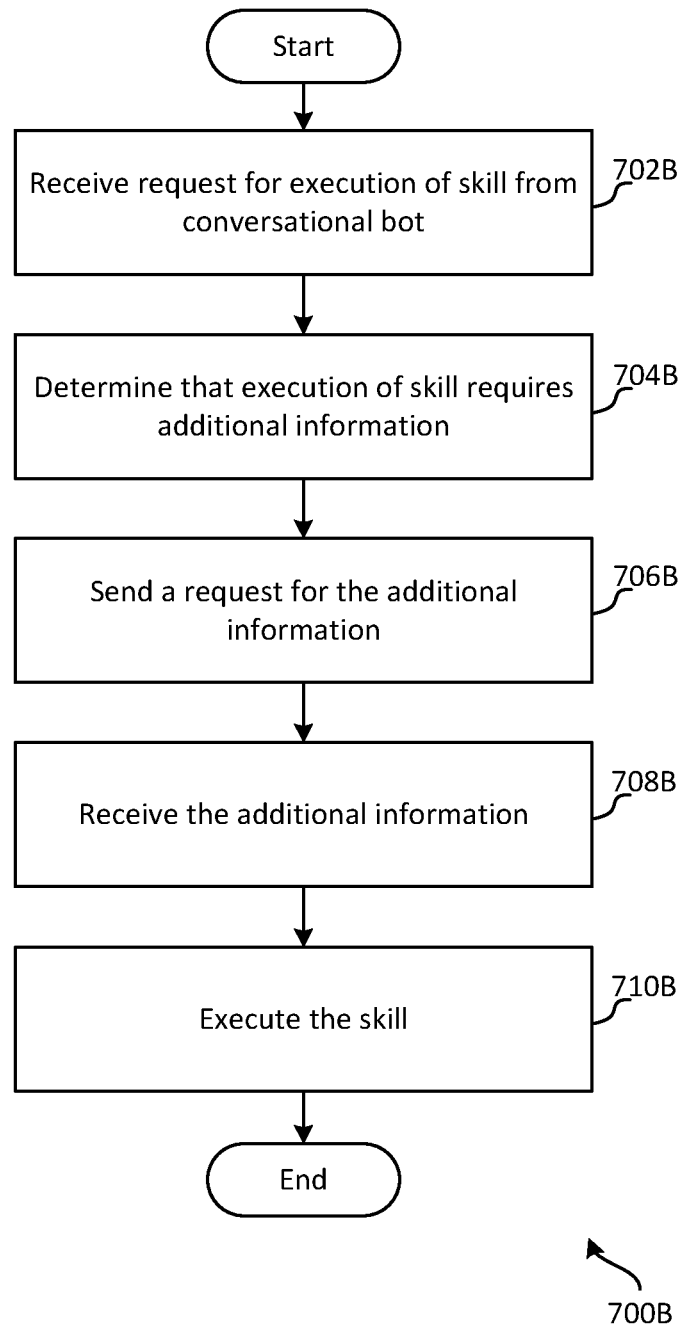
FIG. 7B is another exemplary method for enabling conversational bot communications in relation to a natural language input.

FIG. 7B is another exemplary method 700B for enabling conversational bot communications in relation to a natural language input. The method 700B begins at a start operation and flow moves to operation 702B.

At operation 702B a request for execution of a skill is received by a second conversational bot from a first conversational bot. The request for execution of the skill may be received in the form of the natural language input or a schematized format. According to some examples, the second conversational bot may determine whether the first conversational bot executes a PII scrubbing skill. In examples, the second conversational bot may only execute the skill for the first conversational bot if the first conversational bot executes a PII scrubbing skill.

From operation 702B flow continues to operation 704B where a determination is made by the second conversational bot that execution of the skill requires additional information. The information may relate to the user that generated the natural language input. For example, the second conversational bot may need payment information, time information, location information, among other information types, to execute the skill.

From operation 704B flow continues to operation 706B where a request for the additional information is sent from the second conversational bot to the first conversational bot. The request may be sent to the second conversational bot via an API.

From operation 706B flow continues to operation 708B where the additional information is received by the second conversational bot.

From operation 708B flow continues to operation 710B where the second conversational bot executes the skill. The second conversational bot may then pass control of the conversation back to the first conversational bot.

From operation 710 B flow moves to an end operation and the method 700B ends.

Figure 8:
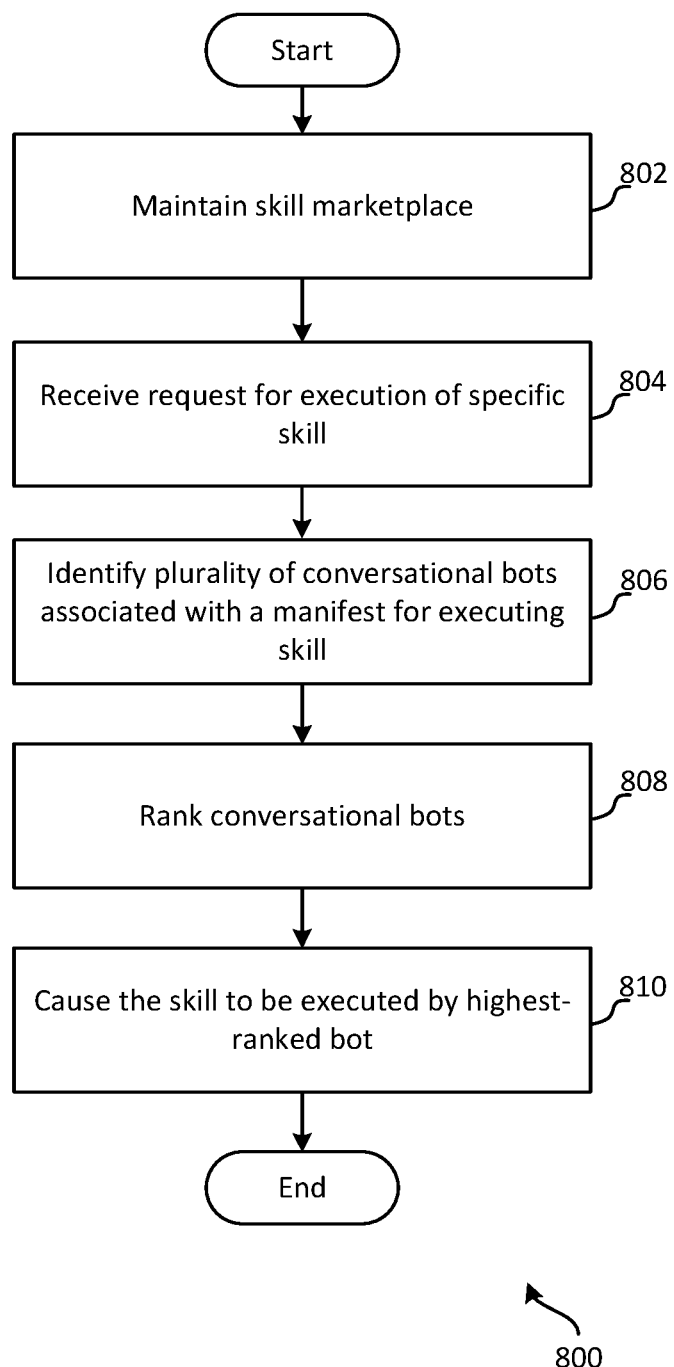
FIG. 8 is an exemplary method for enabling conversational bot communications in relation to a natural language input and a manifest marketplace.

FIG. 8 is an exemplary method 800 for enabling conversational bot communications in relation to a natural language input and a manifest marketplace. The method 800 begins at a start operation and flow moves to operation 802.

At operation 802 a marketplace comprising an identity of a plurality of skills is maintained, each of the plurality of skills associated with a manifest and a conversational bot. The manifest marketplace may include a skill library that includes an identity of each of a plurality of conversational bots, an identity of one or more skills that are associated with each of those conversational bots, and one or more manifests associated with those one or more skills. In examples, the skills and/or the manifests included in the skill library may be classified, tagged, organized, or otherwise associated with a skill type. As such, the skills and/or manifests may be searchable and/or matched to natural language queries and commands, and schema-defined queries and commands, that are received by a conversational bot service.

From operation 802 flow continues to operation 804 where a request for execution of a specific skill is received. The request may be received by the conversational bot service and/or a manifest marketplace. The request may be in the form of a natural language input or it may be in a schematized format.

From operation 804 flow continues to operation 806 where a plurality of conversational bots is identified, each of the plurality of conversational bots being associated with a manifest for executing the specific skill. In examples, the identification may be made based on keyword and/or phrase matching between a natural language input comprising the request for the specific skill, and categorized skill names in the skill library.

From operation 806 flow continues to operation 808 where the plurality of conversational bots is ranked. The plurality of conversational bots may be ranked based on a calculated value for each of the conversational bots. The value may be based on one or more of: a relevance of the bot to the requested skill, a popularity of the bot, a popularity of a website associated with the bot, user preferences, and user history of interaction with the conversational bots.

From operation 808 flow continues to operation 810 where the skill is caused to be executed by the highest-ranked conversational bot.

From operation 810 flow moves to an end operation and the method 800 ends.

Figure 9:
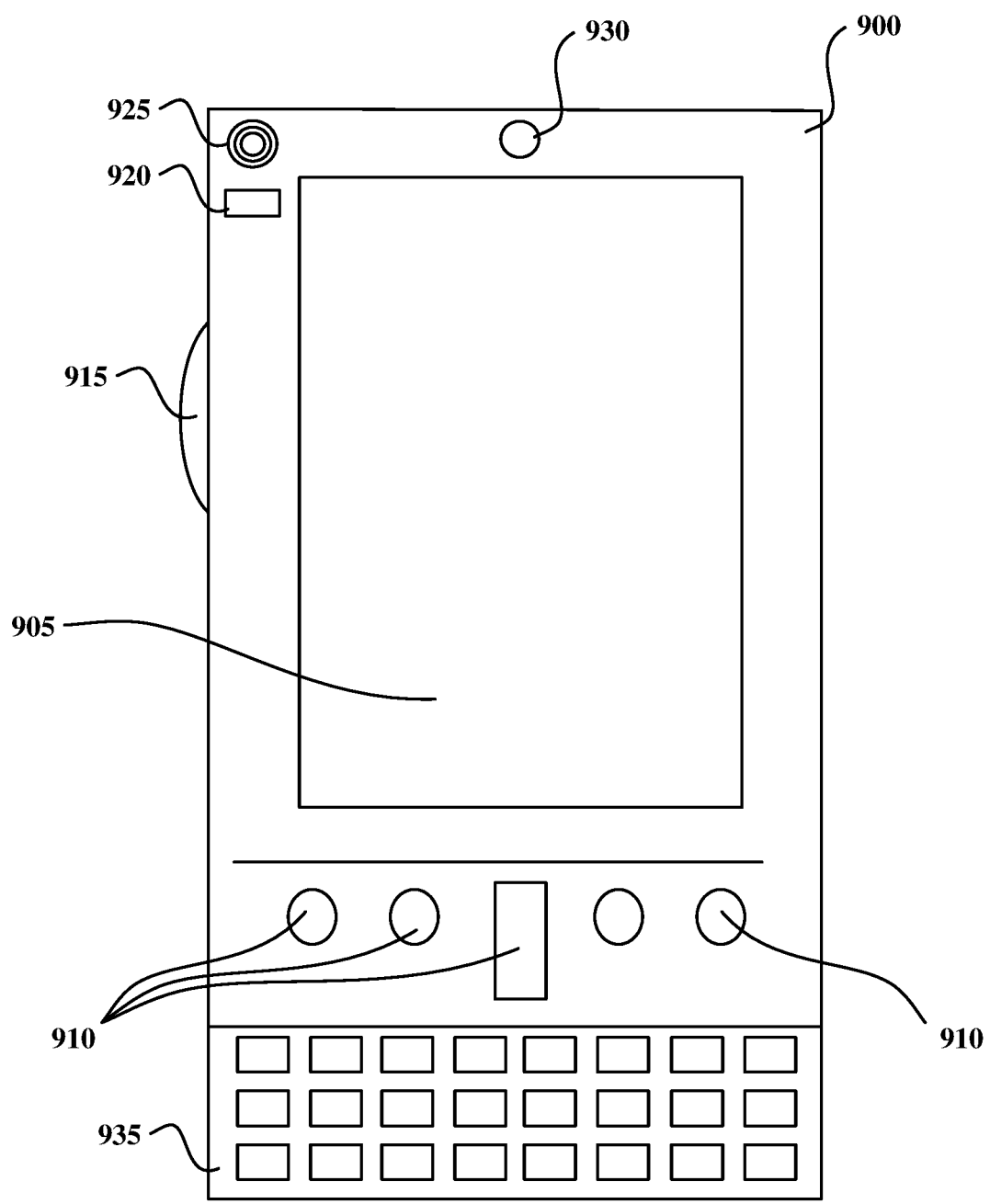
FIGS. 9 and 10 are simplified diagrams of a mobile computing device with which aspects of the disclosure may be practiced.
Figure 10:
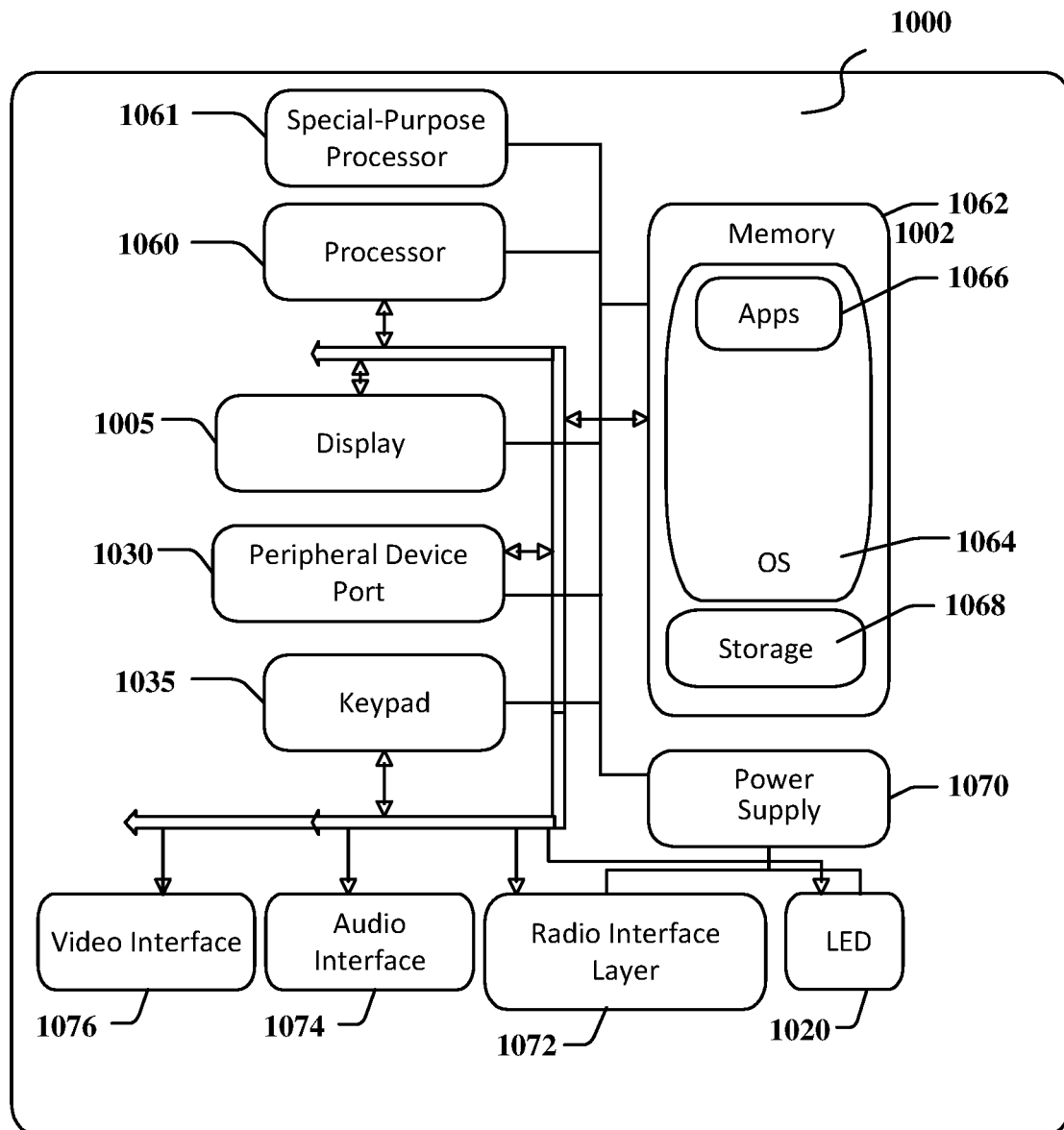

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a conversational bot platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
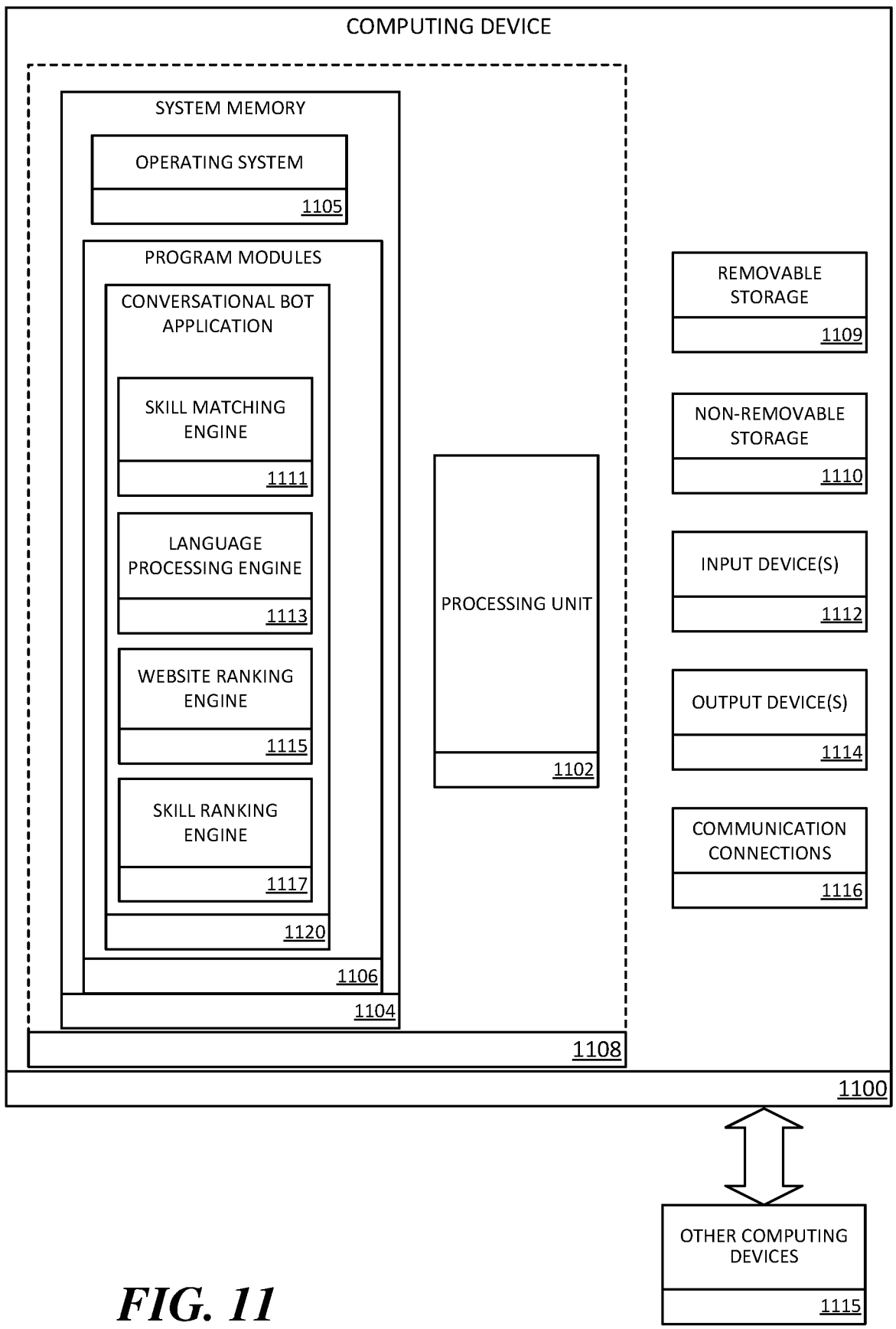
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for assisting conversational bot interactions. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more conversational bot applications and/or services. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., conversational bot application 1120) may perform processes including, but not limited to, the aspects, as described herein. According to examples, skill matching engine 1111 may perform one or more operations associated with matching a query and/or command included in a natural language input to one or more skills that may be executed by a conversational bot. Language processing engine 1113 may perform one or more operations associated with applying one or more natural language processing models to a natural language input to identify one or more tasks and associated skill requests therein. Website ranking engine 1115 may perform one or more operations associated with scoring a plurality of websites associated with conversational bots and ranking those bots based on the scores. Skill ranking engine 1117 may perform one or more operations associated with scoring skills associated with conversational bots based on match to natural language input and/or schematized request, popularity of bot, popularity of corresponding website, popularity for specific user, and user preferences, for example, and ranking the bots based on those scores.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
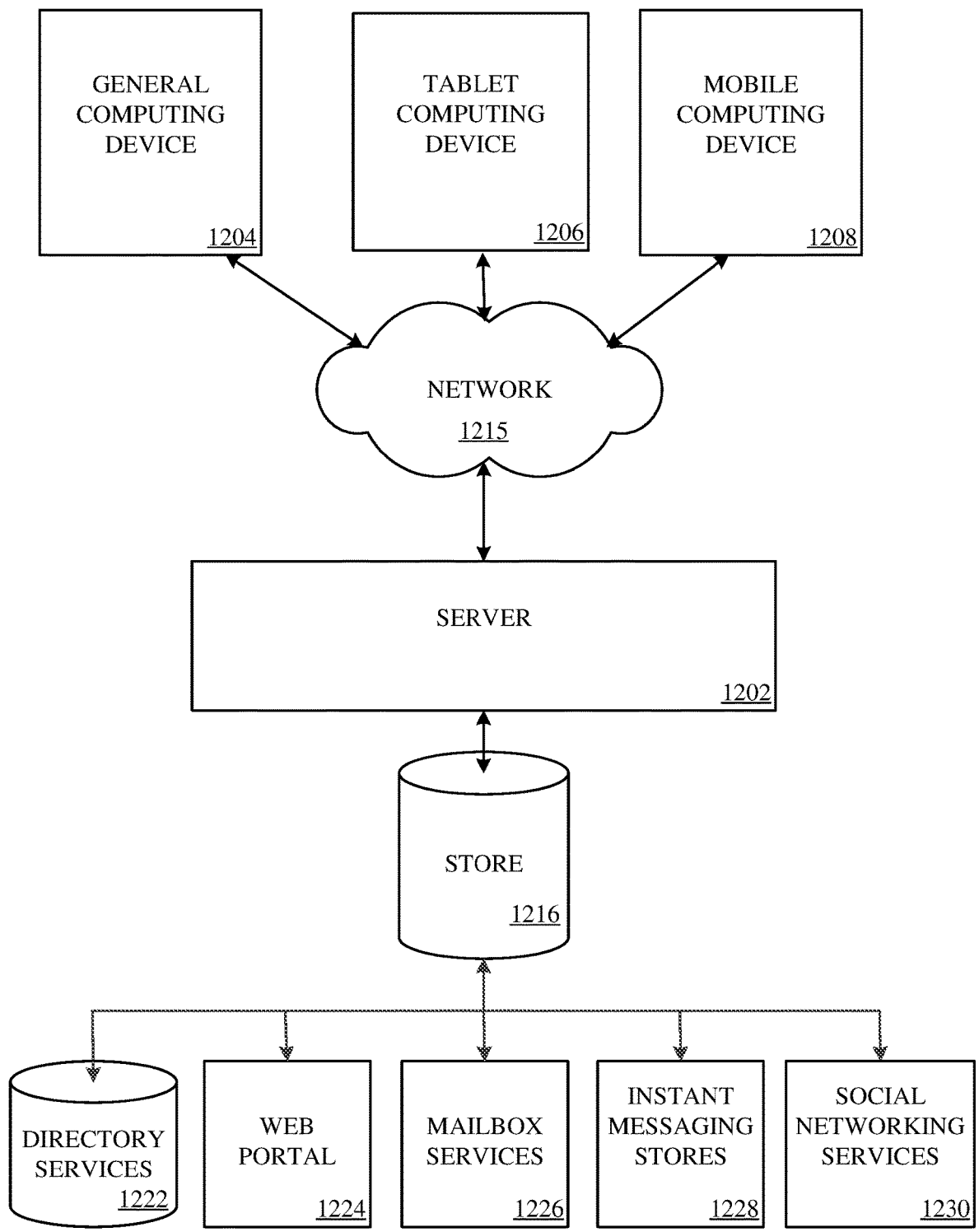
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for enabling conversational bot communications, the method comprising:
   maintaining a marketplace comprising an identity of each of a plurality of conversational bots, an identity of a plurality of skills, and a plurality of manifests, wherein each manifest of the plurality of manifests corresponds to one conversational bot of the plurality of conversational bots and one skill of the plurality of skills, and wherein each manifest of the plurality of manifests comprises connection information for connecting to a corresponding conversational bot and activity information that defines operations that the corresponding conversational bot can execute related to a corresponding skill;
   receiving a request for execution of a specific skill;
   querying the marketplace for the specific skill to identify a set of conversational bots from the plurality of conversational bots that can perform the specific skill and an associated manifest corresponding to each identified conversational bot and the specific skill;
   ranking the set of conversational bots, wherein the ranking is based on a popularity of a plurality of websites, and wherein each of the plurality of websites is associated with one of the set of conversational bots;
   identifying a highest ranked conversational bot and the connection information and activity information for the highest ranked conversational bot from the associated manifest; and
   causing the specific skill to be executed by a highest ranked conversational bot using the connection information and activity information from the associated manifest.

2. The computer-implemented method of claim 1, further comprising:
   populating the marketplace, the populating comprising:
   crawling a plurality of website directories;
   identifying a new skill from the crawling of the plurality of website directories; and
   adding the new skill to the marketplace.

3. The computer-implemented method of claim 1, wherein the request for execution of the specific skill is received from a first conversational bot.

4. The computer-implemented method of claim 1, further comprising:
   receiving a request to register a new skill to the marketplace;
   identifying a skill type associated with the request; and
   determining whether the new skill includes each of a plurality of marketplace requirements, the marketplace requirements comprising a requisite activity each skill of the skill type must support.

5. The computer-implemented method of claim 4, further comprising:
   registering the new skill to the marketplace if a determination is made that the new skill includes each of the plurality of marketplace requirements for the skill type.

6. The computer-implemented method of claim 4, further comprising:
   denying registration of the new skill to the marketplace if a determination is made that the new skill does not include each of the plurality of marketplace requirements for the skill type.

7. A system for enabling conversational bot communications, comprising:
   a memory for storing executable program code; and
   one or more processors, functionally coupled to the memory, the one or more processors being responsive to computer-executable instructions contained in the program code and operative to:
   maintain a marketplace comprising an identity of each of a plurality of conversational bots, an identity of a plurality of skills, and a plurality of manifests, wherein each manifest of the plurality of manifests corresponds to one conversational bot of the plurality of conversational bots and one skill of the plurality of skills, and wherein each manifest of the plurality of manifests comprises connection information for connecting to a corresponding conversational bot and activity information that defines operations that the corresponding conversational bot can execute related to a corresponding skill;
   receive a natural language input comprising one of:
   a query, and
   a command;
   identify a specific skill needed to complete a task associated with the natural language input;
   query the marketplace for the specific skill to identify a set of conversational bots from the plurality of conversational bots that can perform the specific skill and an associated manifest corresponding to each identified conversational bot and the specific skill;
   rank the set of conversational bots, wherein the ranking is based on a popularity of a plurality of websites, and wherein each of the plurality of websites is associated with one of the set of conversational bots;
   identify a highest ranked conversational bot and the connection information and activity information for the highest ranked conversational bot from the associated manifest; and
   cause an identity of a plurality of highest-ranked conversational bots to be surfaced.

8. The system of claim 7, wherein the one or more processors are further responsive to the computer-executable instructions contained in the program code and operative to:
   receive a selection of one of the highest-ranked conversational bots; and
   cause the selected conversational bot to execute the specific skill using the connection information and activity information from the associated manifest.

9. The system of claim 7, wherein the one or more processors are further responsive to the computer-executable instructions contained in the program code and operative to:
   assign a score to each of the set of conversational bots, the score used to rank the set of conversational bots.

10. The system of claim 7, wherein the ranking is further based on a popularity of each of the set of conversational bots.

11. The system of claim 7 wherein the one or more processors are further responsive to the computer-executable instructions contained in the program code and operative to:
   identify the task by applying one or more natural language processing models to the natural language input.

12. The system of claim 7, wherein the one or more processors are further responsive to the computer-executable instructions contained in the program code and operative to:
   populate the marketplace, the populating comprising:
      crawling a plurality of website directories;
      identifying a new skill from the crawling of the plurality of website directories; and
      adding the new skill to the marketplace.

13. The system of claim 7, wherein the one or more processors are further responsive to the computer-executable instructions contained in the program code and operative to:
   receive a request to register a new skill to the marketplace;
   identify a skill type associated with the request; and
   determine whether the new skill includes each of a plurality of marketplace requirements, the marketplace requirements comprising a requisite activity each skill of the skill type must support.

14. The system of claim 13, wherein the one or more processors are further responsive to the computer-executable instructions contained in the program code and operative to:
   register the new skill to the marketplace if a determination is made that the new skill includes each of the plurality of marketplace requirements for the skill type.

15. The system of claim 13, wherein the one or more processors are further responsive to the computer-executable instructions contained in the program code and operative to:
   deny registration of the new skill to the marketplace if a determination is made that the new skill does not include each of the plurality of marketplace requirements for the skill type.

16. A computer-readable storage device comprising executable instructions that, when executed by one or more processors, assists with enabling conversational bot communications, the computer-readable storage device including instructions executable by the one or more processors for:
   maintaining a marketplace comprising an identity of each of a plurality of conversational bots, an identity of a plurality of skills, and a plurality of manifests, wherein each manifest of the plurality of manifests corresponds to one conversational bot of the plurality of conversational bots and one skill of the plurality of skills, and wherein each manifest of the plurality of manifests comprises connection information for connecting to a corresponding conversational bot and activity information that defines operations that the corresponding conversational bot can execute related to a corresponding skill;
   receiving a request for execution of a specific skill;
   querying the marketplace for the specific skill to identify a set of conversational bots from the plurality of conversational bots that can perform the specific skill and an associated manifest corresponding to each identified conversational bot and the specific skill;
   ranking the set of conversational bots, wherein the ranking is based on a popularity of a plurality of websites, and wherein each of the plurality of websites is associated with one of the set of conversational bots;
   identifying a highest ranked conversational bot and the connection information and activity information for the highest ranked conversational bot from the associated manifest; and
   causing the specific skill to be executed by a highest ranked conversational bot using the connection information and activity information from the associated manifest.

17. The computer-readable storage device of claim 16, wherein the instructions are further executable by the one or more processors for:
   populating the marketplace, the populating comprising:
      crawling a plurality of website directories;
      identifying a new skill from the crawling of the plurality of website directories; and
      adding the new skill to the marketplace.

18. The computer-readable storage device of claim 16, wherein the instructions are further executable by the one or more processors for:
   receiving a request to register a new skill to the marketplace;
   identifying a skill type associated with the request; and
   determining whether the new skill includes each of a plurality of marketplace requirements, the marketplace requirements comprising a requisite activity each skill of the skill type must support.

* * * * *